United States Patent [19]

Zeager

[11] Patent Number: 4,788,790

[45] Date of Patent: Dec. 6, 1988

[54] METHOD OF MAKING A DARK, UNIFORMLY-COLORED, HARDWOOD MULCH

[76] Inventor: Charles B. Zeager, 40006 E. Harrisburg Pike, Middletown, Pa. 17057

[21] Appl. No.: 871,326

[22] Filed: Jun. 6, 1986

[51] Int. Cl.[4] .............................................. A01G 7/00
[52] U.S. Cl. .............................................. 47/9; 8/156
[58] Field of Search ............... 47/9, 56; 8/156, 158; 162/DIG. 2, DIG. 12

[56] References Cited

U.S. PATENT DOCUMENTS

| | | | |
|---|---|---|---|
| 1,819,963 | 8/1931 | Morterud | 8/156 |
| 3,091,436 | 5/1963 | Finn | 47/9 |
| 3,393,122 | 7/1968 | Marshal | 162/DIG. 12 |
| 4,058,124 | 11/1977 | Yen et al. | 47/9 |
| 4,250,662 | 2/1981 | Rees et al. | 111/1 |
| 4,339,890 | 7/1982 | Koenig et al. | 47/9 |

Primary Examiner—Richard J. Johnson

[57] ABSTRACT

Method of making a dark, uniformly-colored, hardwood mulch by forming a mass of large-fibered hardwood pulp consisting essentially of 20–100% by weight large-fibered, hardwood bark pulp and 0–80% of large-fibered hardwood wood pulp, but preferably at least about 25% by weight of the wood pulp. Water is passed through the mass in an amount greater than that necessary to saturate the mass in order that the excess water may be constantly recycled through the mass of fibers. Recycling continues until the mass of wood fibers and pulp fibers achieve the desired dark, uniform color.

5 Claims, No Drawings

METHOD OF MAKING A DARK, UNIFORMLY-COLORED, HARDWOOD MULCH

BACKGROUND OF THE INVENTION

Field of the Invention

The invention relates to a method of making a dark, uniformly-colored, hardwood mulch for use as a ground cover. Such mulches are used in landscaping for homes, apartment complexes, institutions, schools, and wherever there is a need for beautifying bare ground. Such mulches also minimize the growth of weeds, help maintain the moisture content of the ground, help prevent erosion, and attractively set off the areas of mulch against areas of grass, concrete, parking lots, and the like. Mulches are often made simply of ground-up bark, preferably hardwood bark, and preferably oak bark. While mulches may also be made of pulverized, hardwood chips, such mulches are lighter in color and not as visually attractive as mulches of pure bark. Even pure bark mulches may not be uniformly colored. Yet bark, particularly oak bark, s growing scarce and more expensive as the years go on. Accordingly, there is a need for a method of uniformly darkening an all-bark mulch and of adding a bark substitute in part and eliminating the usual, extensive aging period which may last as long as a year.

SUMMARY OF THE INVENTION

The invention contemplates forming a mass of large-fibered, hardwood pulp consisting essentially of 20%–100% large-fibered hardwood bark pulp, any balance being large-fibered, hardwood wood pulp. Water is passed through the mass of pulp in an amount more than sufficient to saturate the mass. Excess water is then recycled through the mass, with additional make-up water being added, if necessary. The recycling of the water is continued until the mass reaches the desirable chocolate brown color. The mulch is then ready for use.

DETAILS OF THE PROCESS

The materials used to prepare for the process are hardwood wood chips and hardwood bark- chips prepared by known chipping processes. These chips will usually measure about 2×3 centimeters and have a thickness ranging from about one-quarter to one-half centimeter. The mass of chips will normally include some fines and splinters and an occasional larger chip.

The best way to put the wood chips into condition to go through the present process is to pass the chips through a hammer mill such as a Schutte Pulverizer running at the relatively high rate of speed of about 3400 r.p.m. One pass usually suffices and it is preferred that narrow hammers be used in the mill. Bark, being more friable, calls for a slower speed of about 2100 r.p.m., and bar-type screens of about 3"×4". Screens in the hammer mill of about 1½ inch are preferred. The material that emerges from the hammer mill, or equivalent treatment, will have been reduced in size and will be in suitable condition to be subjected to the present process and, further, will be of a suitable size to serve as a mulch. There will be a large number of small fibers intermixed with a gradually increasing woo-d fiber size or bark fiber size as the case may be. Most of the fibers are acicular, and many of them will resemble short, blunt toothpicks. A few small chips will; remain measuring about 1-2 centimeters by one-quarter centimeter to one-half centimeter by about 1-4 millimeters thick. It is this mixture that is referred to herein as a large-fibered pulp. Both the hardwood bark and the hardwood wood are reduced in size in, for example, the hammer mill, and both emerge in approximately the fiber size range describe above. The bark pulp, however, will always contain a greater amount of fines than the wood pulp. Mixtures of bark can be used.

The wood fibers and the bark fibers are then admixed in an amount such that the mixture contains at least 20% by weight bark fibers. The higher the proportion of bark, the shorter will be the time of treatment by recycling water through the mass. Amounts of bark fiber less than about 20% by weight will not produce a dark enough color in the mixture. Other factors which contribute to the darkening of the mixture are temperature and degree of aeration of the mixture. Since the process is normally carried out out-of-doors, the process moves much faster in summer than in winter and the temperature should always be above freezing. Rain and snow falling on the mass merely contribute additional water to that which is being recycled.

The mixing of the two kinds of large-fibered pulp can be carried out in any convenient way The pulps may even be stratified, layer upon layer. The more intimate the mixture of the two kinds of pulp, the better the final color and the shorter the processing time. While bark alone can often serve as an attractive, suitable mulch, the larger amount of fines and the reduced resistance to deterioration leave something to be desired. Incorporation of at least about 25% by weight of the total mass of large-fibered, hardwood wood pulp improves resistance of the mulch to wind erosion and renders the mulch more durable against deterioration from sunlight.

Where oak or walnut bark is used, the amount of the large-fibered bark pulp may be the minimum of the 20% by weight of the total mass. Where other hardwoods, such as poplar, maple, yellow- birch and hickory, are used, the amount of large-fibered bark pulp should be increased, usually to at least about 35% by weight, of the bark pulp. The preferred mixture contains about 25% oak bark fibers and about 75% oak wood fibers.

The mass of pulp will normally be formed out-of-doors in suitable troughs or receptacles. While concrete troughs may be used, it has been found that forming the pile on the ground, once the top soil has been removed, is the most convenient system. The trough will have a low point so that the water which has permeated through the fiber mass in the pile will accumulate at the low point in order that pumps may recycle the water to the top of the pile. Hoses and piping in any convenient configuration may be used so long as the recycled water reaches all parts of the pile.

The recycled water promptly turns very dark, substantially black, as it picks up the tannins and other solubles from the fiber mass. As the water is recycled, the pile grows darker. In the summer, at the preferred temperature range of 65°-85° F. (18.3°-29.3° C.), several days may suffice to achieve the desired color while, in the winter, several weeks may be needed. These relatively short time periods are to be contrasted with the months—up to a year of the prior aging period.

Since mulch is a large-volume commodity, the piles are normally large. A conveniently sized pile will measure 90-100 meters long, 8-12 meters wide and 3-6 meters thick. It can be seen that large volumes of recycled water must be pumped to keep the recycled water percolating down through the pile.

Oxidation doubtless plays a part in producing the dark color and in improving the rot resistance of the mulch. The large-fibered bark pulp is just about the same color as the large-fibered wood pulp when the pile of fibers is first formed and before water recycling has taken place. Additional darkening will occur when the process is ended and the pile is worked over and mixed by handling equipment, preferably a bulldozer. Not only does such handling increase the darkening, doubtless by further oxidation, but it renders the entire mass more uniformly colored by admixing any lighter and darker regions.

There will normally be residual, black water remaining at the end of the process, and that residual, black water can be used to treat the next fibrous mass along with any make-up water needed to oversaturate the fibrous mass.

I claim:

1. The method of making a dark, uniformly-colored hardwood mulch comprising:
    (1) forming a mass of large-fibered, hardwood pulp consisting essentially of 20-100% by weight of large-fibered hardwood bark pulp and 0-80% by weight of large-fibered hardwood wood pulp, most of said large fibers being acicular,
    (2) passing water through said mass in an amount in excess of that sufficient to saturate said mass; and
    (3) recycling excess water through said mass until a substantially uniform, dark color is obtained.
2. The method according to claim 1 wherein said large-fibered, hardwood bark pulp is oak.
3. The method according to claim 1 wherein said large-fibered, hardwood wood pulp is oak.
4. The method according to claim 1 wherein said large-fibered, hardwood bark pulp is oak and is present in the mass in an amount of about 25% by weight.
5. The method according to claim 1 where in said mass contains at least about 25% by weight large-fibered, hardwood wood pulp.

* * * * *